(12) United States Patent
Samuel et al.

(10) Patent No.: US 11,928,218 B2
(45) Date of Patent: Mar. 12, 2024

(54) (BIOS) ENFORCED APPLICATION BLOCKLIST SYSTEM AND METHOD

(71) Applicant: Dell Products, L.P., Round Rock, TX (US)

(72) Inventors: Balasingh Ponraj Samuel, Round Rock, TX (US); Richard M. Tonry, Georgetown, TX (US); Jacob Vincent Mink, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 154 days.

(21) Appl. No.: 17/660,070

(22) Filed: Apr. 21, 2022

(65) Prior Publication Data
US 2023/0342473 A1 Oct. 26, 2023

(51) Int. Cl.
*G06F 21/57* (2013.01)
*G06F 21/51* (2013.01)

(52) U.S. Cl.
CPC ............ *G06F 21/575* (2013.01); *G06F 21/51* (2013.01); *G06F 2221/033* (2013.01)

(58) Field of Classification Search
CPC ......... G06F 21/75; G06F 21/575; G06F 21/51
See application file for complete search history.

(56) References Cited

U.S. PATENT DOCUMENTS

| | | | | |
|---|---|---|---|---|
| 5,421,006 | A * | 5/1995 | Jablon | G06F 21/575 714/36 |
| 7,376,977 | B2 * | 5/2008 | Jindal | G06F 21/51 726/30 |
| 8,230,510 | B1 * | 7/2012 | Yang | G06F 21/564 726/25 |
| 8,959,624 | B2 * | 2/2015 | Gray | G06F 21/552 726/1 |
| 10,395,039 | B2 * | 8/2019 | Khatri | G06F 21/575 |
| 11,188,645 | B2 * | 11/2021 | Hay | G06F 21/562 |
| 2009/0083731 | A1 * | 3/2009 | Sobel | G06F 21/51 717/177 |
| 2010/0313268 | A1 * | 12/2010 | Abdulhayoglu | G06F 21/566 726/24 |
| 2016/0246973 | A1 * | 8/2016 | Ladikov | G06F 21/604 |
| 2018/0139216 | A1 * | 5/2018 | Rasanen | H04L 63/1416 |
| 2023/0041534 | A1 * | 2/2023 | Jakobsson | G06F 21/56 |

* cited by examiner

*Primary Examiner* — Raymond N Phan
(74) *Attorney, Agent, or Firm* — Fogarty LLP (57) ABSTRACT

Systems and methods for providing a Basic Input/Output System (BIOS) enforced blocklisting of harmful applications are described. In one embodiment, an Information Handling System (IHS) may include a processor and a BIOS coupled to the processor, the BIOS having program instructions that, upon execution, cause the IHS to download an Unsafe Application List (UAL) from an online source, and during a bootstrap process of the IHS, compare a plurality of Applications (Apps) installed on the IHS against a list of harmful applications included in a UAL. When a harmful application is found by the comparison, the instructions enforce one or more policies to restrict the harmful application from being executed on the IHS.

20 Claims, 5 Drawing Sheets

(BIOS) ENFORCED APPLICATION BLOCKLIST SYSTEM AND METHOD

BACKGROUND

As the value and use of information continues to increase, individuals and businesses seek additional ways to process and store information. One option is an information handling system (IHS). An IHS generally processes, compiles, stores, and/or communicates information or data for business, personal, or other purposes. Because technology and information handling needs and requirements may vary between different applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, global communications, etc. In addition, IHSs may include a variety of hardware and software components that may be configured to process, store, and communicate information and may include one or more computer systems, data storage systems, and networking systems.

Networking of IHSs has in large part, facilitated distributed computing systems, such as so-called "cloud" computing systems. Within this disclosure, the term cloud computing may include systems or resources used for enabling on-demand network access to a shared pool of configurable computing resources and/or informational content that may be provisioned and released using a cloud model. A cloud model can be configured with varying characteristics, such as on-demand services, breadth of network access (e.g., accessibility), resource pooling, authorization models, and the like. Cloud based service models have become prevalent. For example, certain applications may be hosted on public and private remote systems such as clouds and usually offer a set of web based services for communicating with clients.

Nevertheless, large enterprise level IHS systems are continually under increasing risk of malicious use that can sometimes lead to breaches of confidential information, monetary damages, sabotage, and the like. In particular, threats to workloads may exist from applications that may expose security threats, particularly when ongoing updates throughout the life cycle of the applications continually occur, often with little or no oversight by administrators who are responsible for ensuring the integrity of such enterprise level IHS implementations. It is with these concerns in mind, among others, that embodiments of the present disclosure are presented herein.

SUMMARY

Systems and methods for providing a Basic Input/Output System (BIOS) enforced blocklisting of harmful applications are described herein. In one embodiment, an Information Handling System (IHS) may include a processor and a BIOS coupled to the processor, the BIOS having program instructions that, upon execution, cause the IHS to download an Unsafe Application List (UAL) from an online source, and during a bootstrap process of the IHS, compare a plurality of Applications (Apps) installed on the IHS against a list of harmful applications included in a UAL. When a harmful application is found by the comparison, the instructions enforce one or more policies to restrict the harmful application from being executed on the IHS.

According to another embodiment, a method includes the steps of downloading an Unsafe Application List (UAL) from an online source to an Information Handling System (IHS) using a Basic Input/Output System (BIOS) of the HIS, comparing a plurality of applications installed on the IHS against a list of harmful applications included in a UAL during a bootstrap process of the IHS, such that when a harmful application is found by the comparison, enforcing one or more policies to restrict the harmful application from being executed on the IHS.

According to yet another embodiment, a BIOS of an IHS has program instructions that are executable to download an Unsafe Application List (UAL) from an online source, compare a plurality of Applications (Apps) installed on the IHS against a list of harmful applications included in a UAL during a bootstrap process of the IHS, and when a harmful application is found by the comparison, enforce one or more policies to restrict the harmful application from being executed on the IHS.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity, and have not necessarily been drawn to scale.

DETAILED DESCRIPTION

The present disclosure is described with reference to the attached figures. The figures are not drawn to scale, and they are provided merely to illustrate the disclosure. Several aspects of the disclosure are described below with reference to example applications for illustration. It should be understood that numerous specific details, relationships, and methods are set forth to provide an understanding of the disclosure. The present disclosure is not limited by the illustrated ordering of acts or events, as some acts may occur in different orders and/or concurrently with other acts or events. Furthermore, not all illustrated acts or events are required to implement a methodology in accordance with the present disclosure.

Embodiments of the present disclosure provide a Basic Input Output System (BIOS) enforced application blocklist system and method that continually updates policies for applications that may be executed on an IHS in a cloud computing environment. Whereas the introduction of software updates for a particular application may expose certain security threats, the cloud computing environment identifies those threats and propagates information associated with those security threats to participating IHSs so that the security threats can be remediated on an ongoing basis. Additionally, executable code for performing such threat mitigation may be performed within the BIOS portion of each IHS so that those policies can be effectively enforced.

Certain Operating System (OS)-level applications, throughout their lifecycle, may become vulnerable to attack due to discovered security flaws, deprecation, or by other external factors. For example, a specific version of an application could become unsafe to remain installed on an IHS, such as when the BIOS of the IHS has been downgraded (e.g., reverted to a previous version). However, once uninstalled, there are limited safeguards (e.g., blocklisting) to prevent the user from re-installing the same version of the application (e.g., a software version is always available online once it is released), or potentially even worse, from a cached local installer.

Today, application versioning is often maintained and enforced by the Original Equipment Manufacturers' (OEMs') applications using policies such as blocklisting or via application blocklisting tools, such as APPLOCKER or WINDOWS DEFENDER APPLICATION CONTROL (WDAC) provided by the MICROSOFT CORPORATION. Such blocklisting tools are software based, require proper policies, and can be updated over a publicly accessible network, such as the Internet. Policies, such as these, however, can introduce latency, and in many cases, are not applicable and/or may not be up-to-date when the OS is reinstalled, or the hard drive is changed. This behavior can lead to an increase in attack surface and the likelihood on the IHS configured in an otherwise secure network being breached. Additionally, such behavior can potentially impact other IHSs on the network. This could result in a loss in the user's productivity by causing downtime due to security flaws, customer impact, or brand damage. As such, there has heretofore been no platform bound persistent method available to permanently and proactively disable or uninstall insecure harmful software (e.g., executable programs) on IHSs. As will be described in detail herein below, embodiments of the present disclosure provide a BIOS enforced application blocklist system and method that continually updates policies for applications that may be executed on the IHSs in a cloud computing environment.

For purposes of this disclosure, an IHS may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., Personal Digital Assistant (PDA) or smart phone), server (e.g., blade server or rack server), a network storage device, or any other suitable device and may vary in size, shape, performance, functionality, and price. An IHS may include Random Access Memory (RAM), one or more processing resources such as a Central Processing Unit (CPU) or hardware or software control logic, Read-Only Memory (ROM), and/or other types of nonvolatile memory.

Additional components of an IHS may include one or more disk drives, one or more network ports for communicating with external devices as well as various I/O devices, such as a keyboard, a mouse, touchscreen, and/or a video display. An IHS may also include one or more buses operable to transmit communications between the various hardware components. An example of an IHS is described in more detail below.

Figure 1:
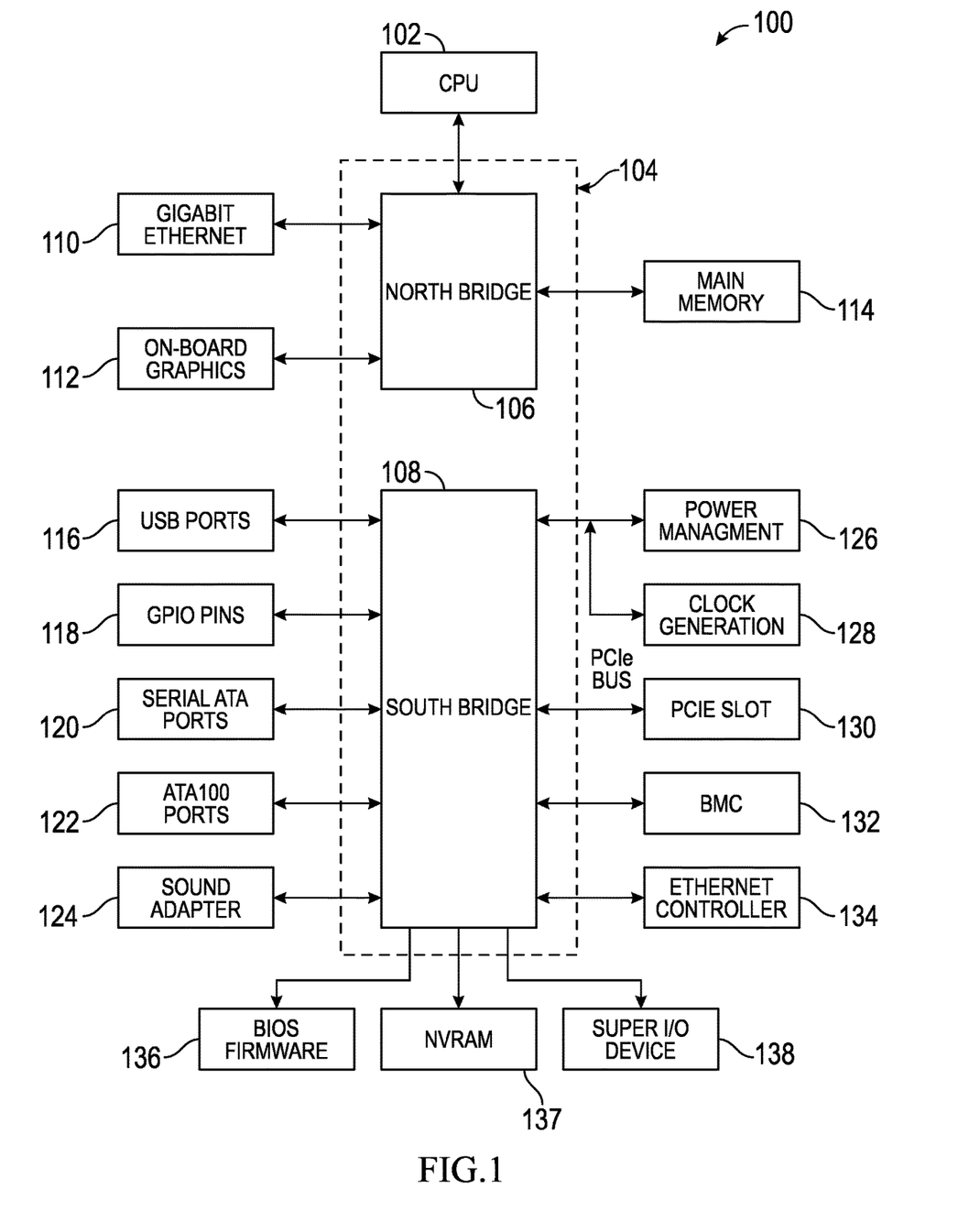
FIG. 1 shows an example of an IHS configured to implement the BIOS enforced application blocklist system according to one embodiment of the present disclosure.

FIG. 1 shows an example of an IHS configured to implement the BIOS enforced application blocklist system according to one embodiment of the present disclosure. It should be appreciated that although certain embodiments described herein may be discussed in the context of a desktop or server computer, other embodiments may be utilized with virtually any type of IHS. Particularly, the IHS includes a baseboard or motherboard 100, which is a printed circuit board (PCB) to which components or devices are mounted to by way of a bus or other electrical communication path. For example, Central Processing Unit (CPU) 102 operates in conjunction with a chipset 104. CPU 102 is a processor that performs arithmetic and logic necessary for the operation of the IHS.

Chipset 104 includes northbridge 106 and southbridge 108. Northbridge 106 provides an interface between CPU 102 and the remainder of the IHS. Northbridge 106 also provides an interface to a random access memory (RAM) used as main memory 114 in the IHS and, possibly, to on-board graphics adapter 112. Northbridge 106 may also be configured to provide networking operations through Ethernet adapter 110. Ethernet adapter 110 is capable of connecting the IHS to another IHS (e.g., a remotely located IHS) via a network. Connections which may be made by network adapter 110 may include local area network (LAN) or wide area network (WAN) connections. Northbridge 106 is also coupled to southbridge 108.

Southbridge 108 is responsible for controlling many of the input/output (I/O) operations of the IHS. In particular, southbridge 108 may provide one or more universal serial bus (USB) ports 116, sound adapter 124, Ethernet controller 134, and one or more general purpose input/output (GPIO) pins 118. Southbridge 108 may also provide a bus for interfacing peripheral card devices such as BIOS boot system-compliant SCSI host bus adapter 130. In some embodiments, the bus may include a peripheral component interconnect (PCI) bus. Southbridge 108 may also provide baseboard management controller (BMC) 132 for use in managing the various components of the IHS. Power management circuitry 126 and clock generation circuitry 128 may also be utilized during operation of southbridge 108.

Additionally, southbridge 108 is configured to provide one or more interfaces for connecting mass storage devices to the IHS. For instance, in an embodiment, southbridge 108 may include a serial advanced technology attachment (SATA) adapter for providing one or more serial ATA ports 120 and/or an ATA100 adapter for providing one or more ATA100 ports 122. Serial ATA ports 120 and ATA100 ports 122 may be, in turn, connected to one or more mass storage devices storing an operating system (OS) and application programs.

An OS may comprise a set of programs that controls operations of the IHS and allocation of resources. An application program is software that runs on top of the OS and uses computer resources made available through the OS to perform application-specific tasks desired by the user.

Mass storage devices connected to southbridge 108 and SCSI host bus adapter 130, and their associated computer-readable media provide non-volatile storage for the IHS. Although the description of computer-readable media contained herein refers to a mass storage device, such as a hard disk or CD-ROM drive, it should be appreciated a person of ordinary skill in the art that computer-readable media can be any available media on any memory storage device that can be accessed by the IHS. Examples of memory storage devices include, but are not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices.

A low pin count (LPC) interface may also be provided by southbridge 108 for connecting Super I/O device 138. Super I/O device 138 is responsible for providing a number of I/O ports, including a keyboard port, a mouse port, a serial interface, a parallel port, and other types of input/output ports.

The LPC interface may connect a computer storage media such as a ROM or a flash memory such as a non-volatile random access memory (NVRAM) for storing BIOS/firmware 136 that includes BIOS program code containing the basic routines that help to start up the IHS and to transfer information between elements within the IHS. BIOS/firmware 136 comprises firmware compatible with the Extensible Firmware Interface (EFI) Specification and Framework.

The LPC interface may also be utilized to connect NVRAM 137 to the IHS. NVRAM 137 may be utilized by BIOS/firmware 136 to store configuration data for the IHS. In other embodiments, configuration data for the IHS may be stored on the same NVRAM 137 as BIOS/firmware 136.

BMC 132 may include non-volatile memory having program instructions stored thereon that enable remote management of the IHS. For example, BMC 132 may enable a user to discover, configure, and manage the IHS, setup configuration options, resolve and administer hardware or software problems, etc. Additionally or alternatively, BMC 132 may include one or more firmware volumes, each volume having one or more firmware files used by the BIOS' firmware interface to initialize and test components of the IHS.

As a non-limiting example of BMC 132, the integrated DELL Remote Access Controller (iDRAC) from DELL, INC. is embedded within DELL POWEREDGE servers and provides functionality that helps information technology (IT) administrators deploy, update, monitor, and maintain servers with no need for any additional software to be installed. The iDRAC works regardless of OS or hypervisor presence from a pre-OS or bare-metal state, because iDRAC is embedded within the IHS from the factory.

It should be appreciated that, in other embodiments, the IHS may comprise other types of computing devices, including hand-held computers, embedded computer systems, personal digital assistants, and other types of computing devices. It is also contemplated that the IHS may not include all of the components shown in FIG. 1, may include other components that are not explicitly shown in FIG. 1, or may utilize a different architecture.

Figure 2:
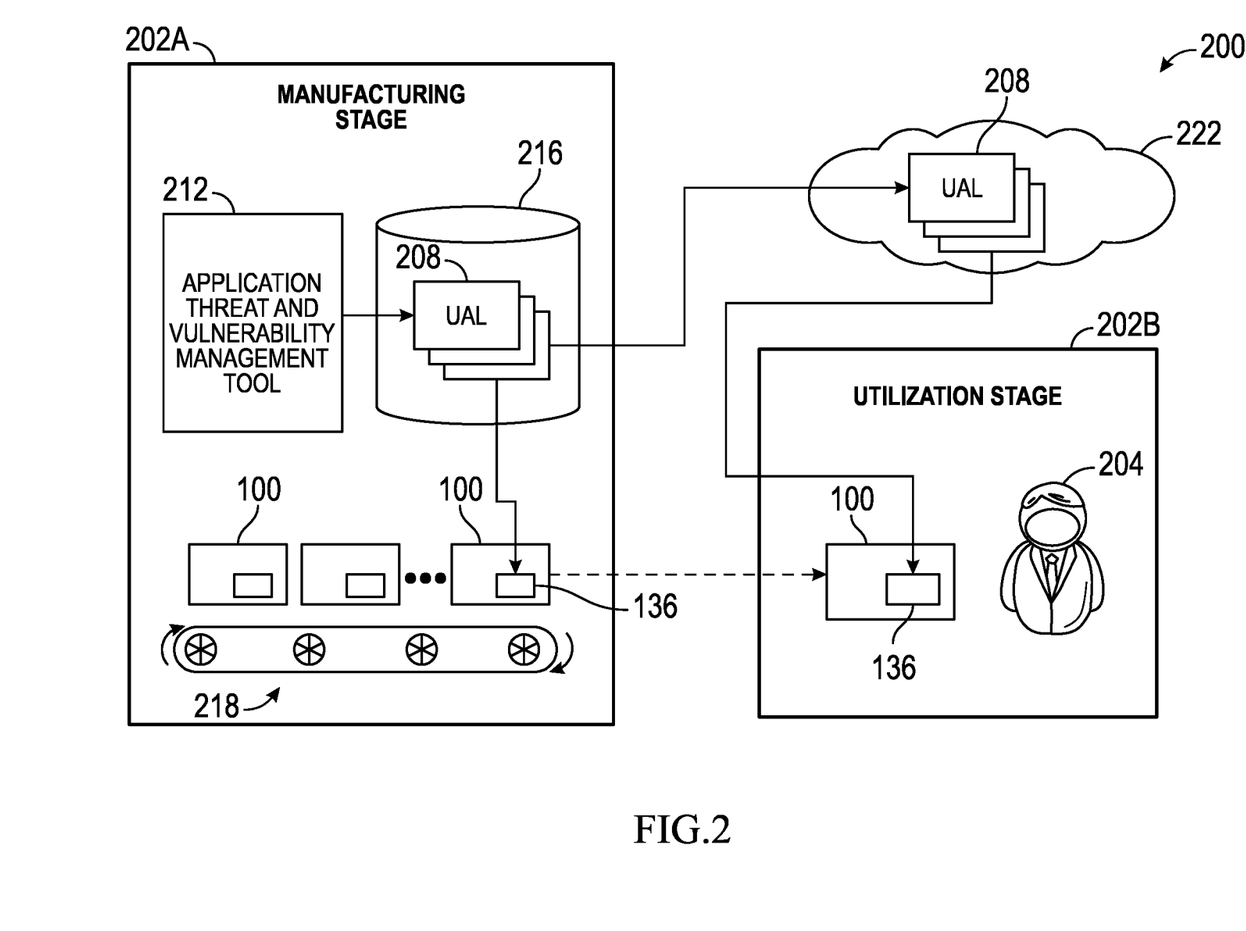
FIG. 2 illustrates an example BIOS enforced hardware-based application blocklist system that may be used for continually updating policies for applications that may be executed on IHSs throughout their lifecycle according to one embodiment of the present disclosure.

FIG. 2 illustrates an example BIOS enforced hardware-based application blocklist system 200 that may be used for continually updating policies for applications that may be executed on IHSs throughout their lifecycle according to one embodiment of the present disclosure. The system 200 as shown depicts a manufacturing stage 202a and a utilization stage 202b of an IHS 100 that form at least a portion of the lifecycle of each of multiple IHSs 100. The manufacturing stage 202a generally refers to a process that may be performed by an IHS vendor to manufacture and configure the IHS 100 for use. The utilization stage 202b, on the other hand, typically occurs after the manufacturing stage 202a where a user 204, following procurement, owns, uses, and maintains the IHS 100. As will be described in detail herein below, the system 200 generates Unsafe Application (App) Lists (UALs) 208 at ongoing intervals, which can then be downloaded into the BIOS 136 of each IHS 100 during the manufacturing stage 202a as well as during the utilization stage 202b to continually provide protection from harmful applications that may occur during the use of the IHS 100.

The UALs 208 may be generated by an application threat and vulnerability management tool 212 that identifies harmful applications as they appear over time, and stores information associated with the harmful applications in an updated UAL 208, which is in turn, stored in a database 216 for being accessed during a manufacturing process 218 to provision each IHS 100 with the UAL 208. Moreover, the UALs 208 may provide ongoing protection for the IHS 100 during the utilization stage 202b by uploading the UALs 208 as they are created to an online vendor portal 222 (e.g., Window Update (WU) server, Linux Vendor Firmware Service (UVFS), etc.) so that they can be downloaded to the IHS 100 during its use.

The application threat and vulnerability management tool 212 continually assesses threats and/or vulnerabilities that may be caused by an application, or a particular version of an application to determine whether that application is a harmful application 210. The application threat and vulnerability management tool 212 may use any suitable source of information to make such a determination. For example, the application threat and vulnerability management tool 212 may access a defect tracking system that generates bug reports about certain applications that may be considered to be harmful. The application threat and vulnerability management tool 212 may also include an online search engine, such as a web crawler, to continually scan the Internet for ongoing issues that may occur with certain application over their lifecycle. As yet another example, the application threat and vulnerability management tool 212 may receive feedback from the IHS 100 in the form of feedback reports generated by the IHS 100 when problems are encountered to identify harmful applications that should be blocklisted from the IHS 100 and/or the IHSs 100 of other users.

In one embodiment, the application threat and vulnerability management tool 212 may include a ledger, such as one used in Project Management Software (PMS), to record information associated with harmful applications by a team of users, such as employees of the manufacturer, who continually monitor the operation of applications that are executed on the IHSs 100 while in the field for those that can construed to be problematic. In another embodiment, the application threat and vulnerability management tool 212 may include a Machine Learning (ML) algorithm such as, for example, a Bayesian algorithm, a Linear Regression algorithm, a Decision Tree algorithm, a Random Forest algorithm, a Neural Network algorithm, or the like. The ML algorithm, in general, receives application-based information, such as that described herein above, and evaluates the information against a trained ML model to obtain profile recommendations about any security threats about certain applications. Using the profile recommendations, the ML algorithm may either blocklist (e.g., deny usage) of certain applications and/or whitelist (e.g., allow usage) of certain other applications.

In another embodiment, the application threat and vulnerability management tool 212 may sign the UAL 208 with a key, such as a private key associated with the IHS manufacturer, to ensure that the UAL 208 does not become compromised during its transit to the IHS 100. In some cases, the UAL 208 may be labeled with an EFI System Resource Table (ESRT) version for servicing the UEFI firmware on UEFI supported devices. For example, the ESRT versioning system allows the applications (e.g., firmware) of the IHS 100 to expose its updatable components to its operating system (OS). In such cases, the OS may load a UEFI capsule with updated applications for installation when the IHS 100 is re-booted. The UEFI capsule may be created by the manufacturer's personnel using the information included in the UAL 208 so that it can be published via the online vendor portal 222.

The UAL 208 (e.g., UEFI capsule) may be downloaded to the BIOS 136 portion of the IHS 100. Downloading and storing the UAL 208 in BIOS 136 may provide certain advantages. For example, the BIOS 136 may be generally immune to corruption from other applications that are executed at the OS level. Additionally, because BIOS 136 is executed prior to the OS being loaded and executed, the policies of the UAL 208 can be effectively enforced each time the IHS 100 is re-booted. For example, the UAL 208 may be encrypted in a NVRAM, NVMe boot partition, or an ESP portion of the BIOS 136. For the field update, the manufacturer may issue a UAL 208 (e.g., Windows/Linux OS capsule update) through WU/LVFS. In this case, the system 200 may download the updates to the BIOS 136 (e.g., platform hardware). In one embodiment, the system 200 may generate a unique ESRT Global Unique Identifier (GUID), which is associated with to each system model to bind each UAL 208 to a specific IHS model.

Figure 3:
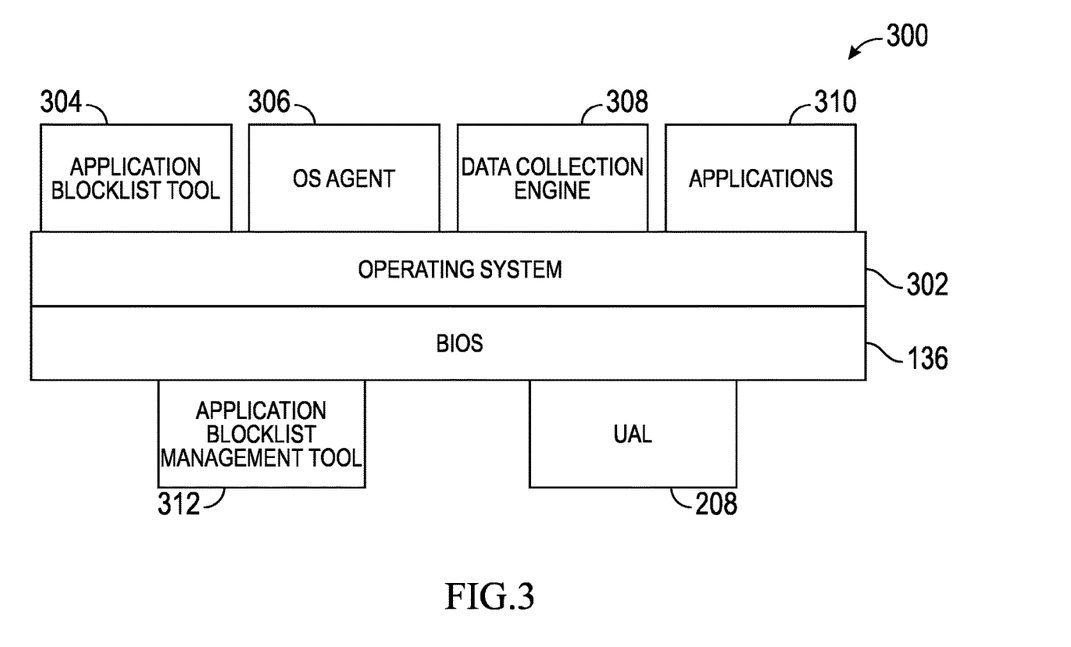
FIG. 3 is a block diagram illustrating an example of software system produced by IHS for enforcing an application blocklist according to one embodiment of the present disclosure.

FIG. 3 is a block diagram illustrating an example of software system 300 produced by IHS 100 for enforcing an application blocklist according to one embodiment of the present disclosure. In some embodiments, each element of software system 300 may be provided by IHS 100 through the execution of program instructions by one or more logic components (e.g., CPU 102, BIOS 136, etc.) stored in a memory (e.g., main memory 110, NVRAM 137, etc.). As shown, software system 300 includes an Operating System 302 on which an application blocklist tool 304 and an OS agent 306 are executed, and a BIOS 136 on which an application blocklist management tool 312 is executed. At least a portion of the application blocklist tool 304, OS agent 306, and/or application blocklist management tool 312 may embody the application threat and vulnerability management tool 212 as described above with reference to FIG. 2.

The OS 302 may also be configured with one or more applications 310 that may be checked to determine whether they should be blocklisted or whitelisted. The applications 310 may be any type (e.g., firmware, software, discrete logic, etc.) and version that can be executed on the OS 302. Examples of suitable applications 310 includes MICROSOFT POWERPOINT, MICROSOFT EXCEL, MICROSOFT WORD, ADOBE ILLUSTRATOR, ADOBE AFTER EFFECTS, ADOBE MEDIA ENCODER, ADOBE PHOTOSHOP, ADOBE PREMIER, AUTODESK AUTOCAD, AVID MEDIA COMPOSER, ANSYS FLUENT, ANSYS WORKBENCH, SONAR CAKEWALK, and the like; as well as media players, web browsers, document processors, email clients, and the like. The applications 310 may also include firmware that is installed in IHS 100 to support certain hardware components of the IHS 100.

The application blocklist tool 304 and OS agent 306 are executed by an OS 302, which is turn supported by BIOS 136. The application blocklist management tool 312 receives a UAL 208, and stores it in the BIOS 136 portion of the IHS 100. In one embodiment, the application blocklist management tool 312 may receive the UAL 208 at any suitable time, such as on an ongoing (e.g., periodic) basis, or in response to a triggering condition, such as when a new application 310 or a new version of an existing application 310 is deployed on the IHS 100.

The OS agent 306 communicates with the application blocklist management tool 312 to receive the UAL 208 from BIOS 136 and process the UAL 208 to determine whether any applications 310 should be either whitelisted or blocklisted. That is, the OS agent 306 may generate one or more policies that may be applied to the applications 310 configured on the IHS 100. For example, once the OS agent 306 has finished processing the UAL 208, it may communicate with the application blocklist tool 304 to apply any determined policies to the application blocklist tool 304. In general, the application blocklist tool 304 functions to enforce one or more policies generated by the OS agent 306 on how the applications 310 are allowed to operate. Examples of suitable types of tools includes an APP-BLOCKER tool or a WINDOWS DEFENDER APPLICATION CONTROL tool provided by the MICROSOFT CORPORATION.

In one embodiment, the software system 300 may also include a data collection engine 308 that may be used to collect data about newly installed applications 310 and any security and/or performance issues that may arise based on the use of those applications 310. The collected data may be fed back to the application threat and vulnerability management tool 212 (FIG. 2) so that any security flaws in the IHS 100 as well as other IHSs may be quickly remedied with other IHSs supported by the vendor. The data collection engine 308 may include any data collection service or process, such as, for example, the DELL DATA VAULT configured as a part of the DELL SUPPORT CENTER that collects information on system health, performance, and environment. In some cases, data collection engine 308 may receive and maintain a database or table that includes information related to IHS application utilization, such as by application, by thread, by hardware resource, and the like.

Figure 4A:
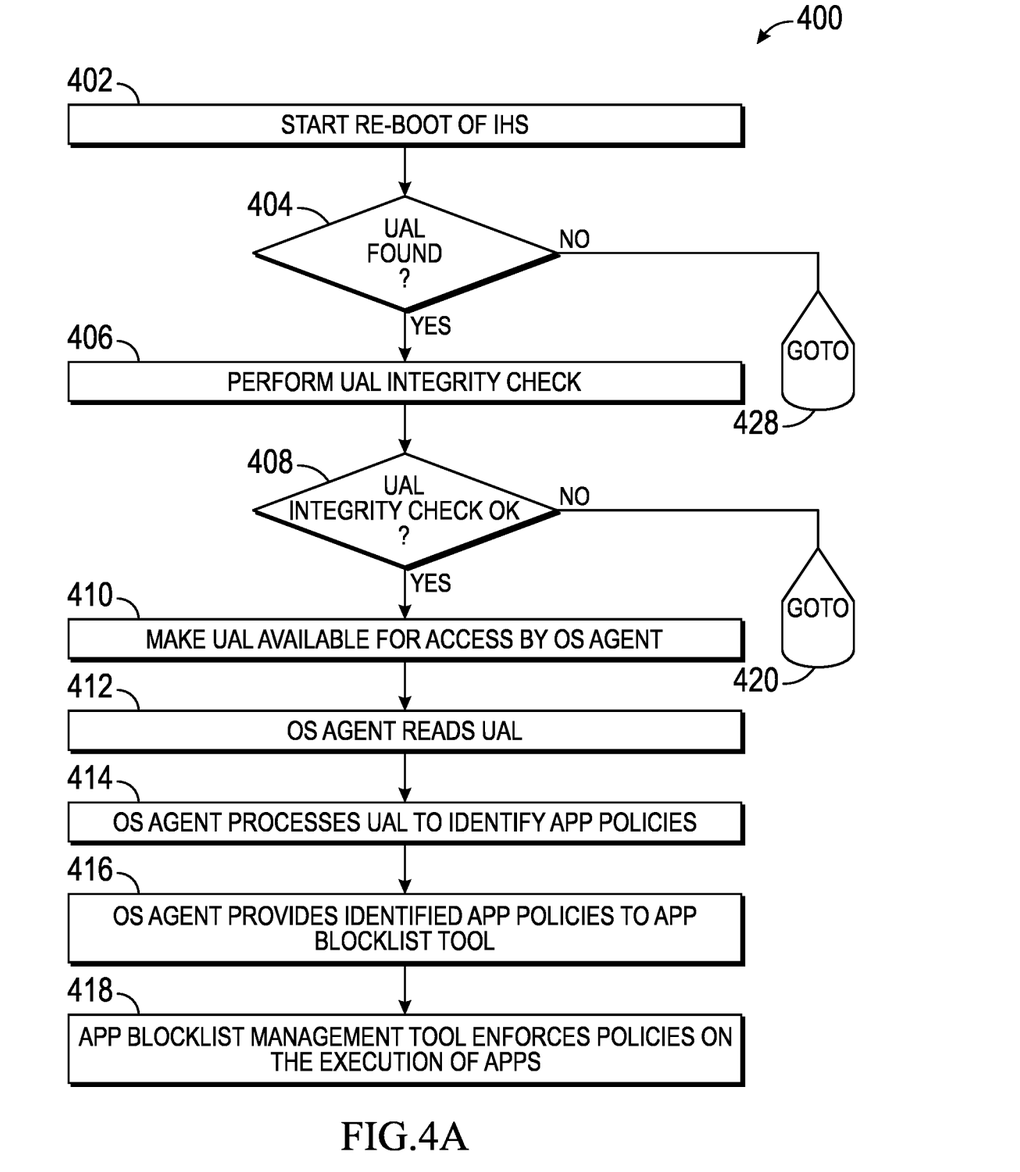
FIGS. 4A and 4B illustrate an example BIOS enforced application blocklist method that may be performed for continually updating policies for applications that may be executed on the IHS according to one embodiment of the present disclosure.
Figure 4B:
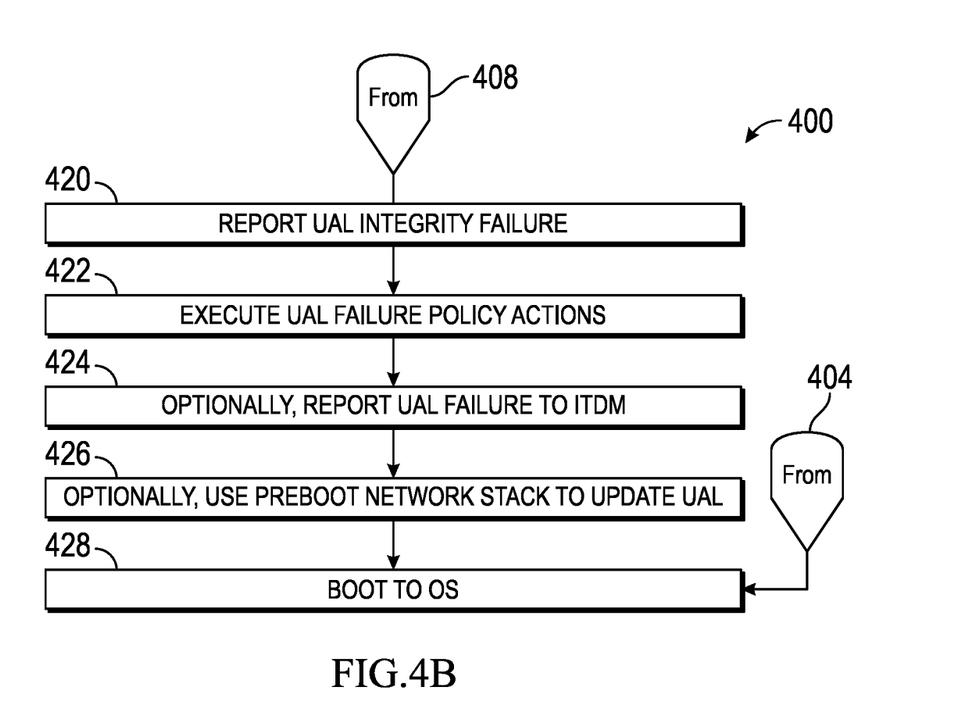

FIGS. 4A and 4B illustrate an example BIOS enforced application blocklist method 400 that may be performed for continually updating policies for applications that may be executed on the IHS according to one embodiment of the present disclosure. Additionally or alternatively, the BIOS enforced application blocklist method 400 may be performed in whole or in part by certain elements of the application blocklist management tool 312, OS agent 306, and/or application blocklist tool 304 as described above with reference to FIG. 3. For example, the BIOS 136 of the IHS 100 may be configured with executable instructions stored in a memory of the BIOS 136 portion of the IHS 100 for performing the various features of the BIOS enforced application blocklist method 400 described herein below.

Initially at step 402, a re-boot process of the IHS 100 is started. While re-booting, the method 400 determines whether a UAL 208 is found at step 404. If so, processing continues at step 406; otherwise, processing continues at step 428. The method 400 at step 406 performs an UAL integrity check. For example, the method 400 may decipher the UAL 208 using a public key of an associated private key that was used to sign the UAL 208 before it was transmitted to the IHS 100. Thereafter at step 408, the method 400 determines whether the signed UAL 208 passes its integrity check. If so, processing continues at step 410; otherwise processing continues at step 420. Steps 420-428 will be described in detail herein below.

At step 410, the method 400 makes the UAL available for use by the OS agent 306. For example, the method 400 may build the UAL 208 as a data record, and place it in memory via an Advance Configuration and Power Interface (ACPI)

using a Windows Management Interface (WMI) technique. Examples of suitable types of entries to be included in the UAL data record may include a (e.g., DELL MILAN) persistent application, a vendor installed service (e.g., DELL TECH HUB agent), and a persistent driver installed application. The OS agent 306 then reads the UAL 208 at step 412, and processes the UAL 208 to identify any application policies to be applied at step 414.

At step 416, the OS agent 306 communicates with the application blocklist tool 304 to update its policies. For example, the OS agent 306 may access and modify a configuration file that is used to store policy information used by the application blocklist tool 304. Thereafter at step 418, the application blocklist management tool 312 enforces policies on the execution of applications 310. In one embodiment, the OS agent 306 itself enforces the policies. For example, the OS agent 306 may communicate with the DELL SERVICES tool provided by DELL TECHNOLOGIES to disallow the execution of certain applications 310 on the IHS 100. For another example, the OS agent 306 may configure the application blocklist tool 304 to disallow the execution of those applications 310.

Steps 420-428 herein below generally describe actions that may be taken by the method 400 when the steps above do not successfully complete. For example, scenarios exist where the UAL 208 does not exist on the IHS 100, such as when the IHS 100 is started in a safe (e.g. failsafe) mode, or when the UAL 208 is purposefully deleted in order to perform diagnostics on the IHS 100. Nevertheless, if no UAL 208 is found as described above at step 404, the method 400 bootstraps the IHS 100 at step 428. If the UAL integrity check fails as described above at step 408, the method reports the UAL integrity failure at step 420. The OS agent 306 may generate a notification message to a display of the IHS 100 notifying the customer 204 that the UAL 208 has been corrupted.

At step 422, the method 400 executes one or more UAL failure policy actions. For example, the method 400 may limit the types of activities that are allowed on the IHS 100 until the UAL 208 is corrected, or preemptively trigger a request for the latest UAL 208 from the vendor cloud portal 222. At step 424, the method 400 optionally, reports the UAL failure to an Information Technology Decision Maker (ITDM). The OS agent 306, for example, may generate a message indicating that the UAL 208 has been corrupted to the vendor cloud portal 222 so the vendor may be made aware of the corrupted UAL 208. Then at step 426, the method 400 may optionally use a pre-boot network stack to update the UAL, and then boot to the OS 302 at step 428.

The method 400 as described above can be repeatedly performed each time the IHS 100 is re-booted to check for, and enforce policies related to the types and versions of applications 310 that are allowed to execute on the IHS 100. Nevertheless, when use of the method 400 is no longer needed or desired, the process ends.

Although FIGS. 4A and 4B describe an example method 400 that may be performed to continually update and enforce policies for applications that may be executed on the IHS, the features of the method 400 may be embodied in other specific forms without deviating from the spirit and scope of the present disclosure. For example, the method 400 may perform additional, fewer, or different operations than those described in the present examples. For another example, the method 400 may be performed in a sequence of steps different from that described above. As yet another example, certain steps of the method 400 may be performed by other components in the IHS 100 other than those described above.

It should be understood that various operations described herein may be implemented in software executed by processing circuitry, hardware, or a combination thereof. The order in which each operation of a given method is performed may be changed, and various operations may be added, reordered, combined, omitted, modified, etc. It is intended that the invention(s) described herein embrace all such modifications and changes and, accordingly, the above description should be regarded in an illustrative rather than a restrictive sense.

The terms "tangible" and "non-transitory," when used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

The invention claimed is:

1. An Information Handling System (IHS), comprising:
a processor; and a Basic Input/Output System (BIOS) coupled to the processor, the BIOS having program instructions stored thereon that, upon execution, cause the IHS to:
  download an Unsafe Application List (UAL) from an online source;
  during a bootstrap process of the IHS, compare a plurality of Applications (Apps) installed on the IHS against a list of harmful applications included in an UAL;
  when a harmful application is found by the comparison, enforce one or more policies to restrict the harmful application from being executed on the IHS.

2. The IHS of claim 1, wherein the program instructions, upon execution, further cause the IHS to:
  compare a version of one application relative to the version of another application installed on the IHS against the UAL; and
  identify the harmful application according to the version of the one application.

3. The IHS of claim 1, wherein the program instructions, upon execution, further cause the IHS to:
  communicate with an application blocklist tool executed on the Operating System (OS) of the IHS to enforce the policies for restricting execution of the harmful application.

4. The IHS of claim 1, wherein the program instructions, upon execution, further cause the IHS to:
  communicate with an OS agent executed on the OS of the IHS to enforce the policies for restricting execution of the harmful application.

5. The IHS of claim 1, wherein the program instructions, upon execution, further cause the IHS to:
  download the UAL during a manufacturing stage of a lifecycle of the IHS.

6. The IHS of claim 1, wherein the program instructions, upon execution, further cause the IHS to:
  download the UAL during a utilization stage of a lifecycle of the IHS.

7. The IHS of claim 1, wherein the program instructions, upon execution, further cause the IHS to:
  wherein enforcing the policies comprises at least one of sandboxing the harmful application, generating a notification indicating the harmful application, and forcing a re-boot of the IHS.

8. The IHS of claim 1, wherein the program instructions, upon execution, further cause the IHS to:
  wherein the information included in the UAL is generated using a Machine Learning (ML) process.

9. The IHS of claim 1, wherein the online source comprises a portal managed by a manufacturer of the IHS.

10. A method comprising:
  downloading an Unsafe Application List (UAL) from an online source to an Information Handling System (IHS) using a Basic Input/Output System (BIOS) of the IHS;
  during a bootstrap process of the IHS, comparing a plurality of applications installed on the IHS against a list of harmful applications included in a UAL;
  when a harmful application is found by the comparison, enforcing one or more policies to restrict the harmful application from being executed on the IHS.

11. The method of claim 10, further comprising:
  comparing a version of one application relative to the version of another application installed on the IHS against the UAL; and
  identifying the harmful application according to the version of the one application.

12. The method of claim 10, further comprising communicating with an application blocklist tool executed on the Operating System (OS) of the IHS to enforce the policies for restricting execution of the harmful application.

13. The method of claim 10, further comprising communicating with an OS agent executed on the OS of the IHS to enforce the policies for restricting execution of the harmful application.

14. The method of claim 10, further comprising downloading the UAL during a manufacturing stage of a lifecycle of the IHS.

15. The method of claim 10, further comprising downloading the UAL during a utilization stage of a lifecycle of the IHS.

16. The method of claim 10, wherein enforcing the policies comprises at least one of sandboxing the harmful application, generating a notification indicating the harmful application, and forcing a re-boot of the IHS.

17. The method of claim 10, further comprising generating the information included in the UAL using a Machine Learning (ML) process.

18. A Basic I/O System (BIOS) having program instructions stored thereon that, upon execution by an Information Handling System (IHS), cause the IHS to:
  download an Unsafe Application List (UAL) from an online source;
  during a bootstrap process of the IHS, compare a plurality of Applications (Apps) installed on the IHS against a list of harmful applications included in a UAL;
  when a harmful application is found by the comparison, enforce one or more policies to restrict the harmful application from being executed on the IHS.

19. The BIOS of claim 18, wherein the program instructions, upon execution, further cause the IHS to:
  compare a version of one application relative to the version of another application installed on the IHS against the UAL; and
  identify the harmful application according to the version of the one application.

20. The BIOS of claim 18, wherein the program instructions, upon execution, further cause the IHS to communicate with an application blocklist tool executed on the Operating System (OS) of the IHS to enforce the policies for restricting execution of the harmful application.

* * * * *